Oct. 24, 1950   D. W. CHANDLER   2,527,351
FENDER FLAG HOLDER
Filed Oct. 10, 1947
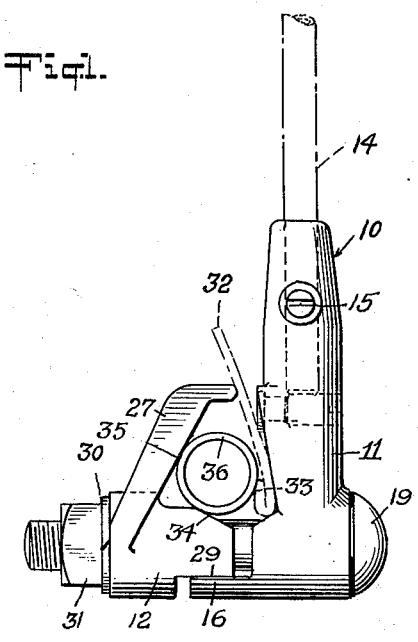
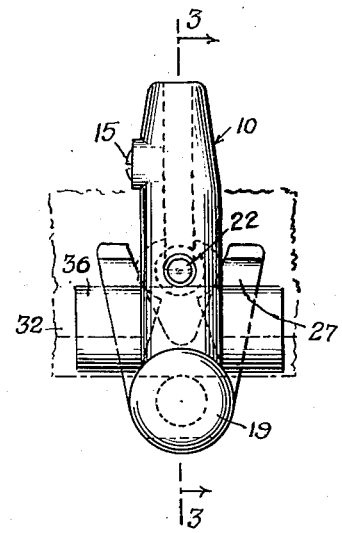
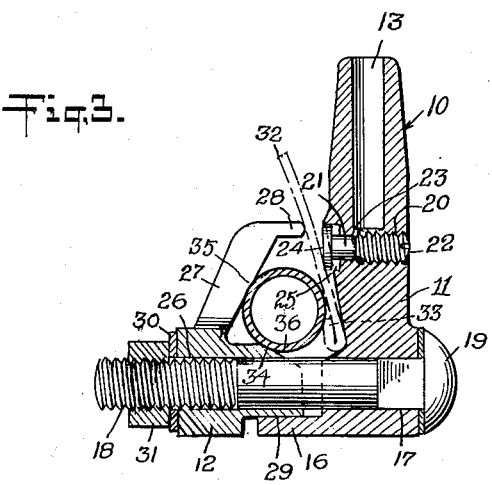
INVENTOR.
Digby W. Chandler
BY
Munn, Liddy & Glaccum
Attorney Patented Oct. 24, 1950

2,527,351

UNITED STATES PATENT OFFICE 2,527,351

FENDER FLAG HOLDER

Digby W. Chandler, Forest Hills, N. Y., assignor to Annin and Company, New York, N. Y.

Application October 10, 1947, Serial No. 779,025

5 Claims. (Cl. 248—43)

My invention relates to flag holders and more specifically to a flag holder that is adapted to be secured to the fender of an automobile.

My principal objective was to design a superior article of this type that would have many advantages over the conventional fender flag holders on the market today.

A further objective was to provide a fender flag holder that could be secured to the fender of any automobile in such a manner that the finish of the automobile would not be marred.

An advantage of my device is that through the novel clamping bracket the flag holder may be adjustably secured to the auto fender in such a manner that it will always retain its selected position on the fender.

Another objective was to provide a fender flag holder that would be simple and sturdy in its construction and at the same time would present an attractive appearance that would not detract from the automobile.

Further advantages and unique features of my device will be apparent as I proceed with the description.

With reference to the drawings:

Figure 1 shows a side elevation of my fender flag holder secured to the fender of an automobile.

Figure 2 shows an end elevation of my fender flag holder; and,

Figure 3 shows a sectional view on line 3—3 of Figure 2.

In Figure 1 I show the preferred embodiment of my fender flag holder 10, whose principal parts consist of an L-shaped socket element 11 and a bracket member 12. The socket element 11 has its upper portion hollowed out forming a hole or socket adapted to receive the pole 14 of the flag. A set screw 15 is provided for the purpose of securing the flag pole 14 in the socket 13. The lower portion of the socket element 11 is provided with a rearwardly extending horizontal flange 16. Extending through the lower portion of the socket element 11 is a horizontal hole 17 adapted to receive the shaft 18 of a round headed carriage bolt 19. Positioned above the hole 17 and below the lower extremity of the socket 13 is a second horizontal hole 20 in which is mounted an adjusting device consisting of a pin 21 and an adjusting screw 22. The pin 21 has a flat base 23 and an enlarged circular head 24 at its inner end that fits in a cut out portion 25 at the rear of the socket element 11.

The bracket member 12 has a base portion with a horizontal hole 26 extending therethrough. Integral with the base and extending upward and inclined toward the socket element 11 are two spaced gripping fingers 27 equipped with horizontal projections 28 at their upper ends. The forward portion of the base has been under cut resulting in the formation of a flat surface 29 that rests on and is adapted to coact with the upper surface of the horizontal flange 16 of the socket element 11.

A clamping block 36 that is adapted to be engaged between the bracket member 12 and the object to which the holder 10 is to be secured is provided to furnish additional clamping surface for the bracket member 12. The block 36, which in its preferred form is cylindrical in shape, may be either tubular or solid in construction. Its rear edge is adapted to butt against the bracket 12 on one side and the object to which the device 10 is to be clamped on the other side, as shown in Figure 1. The block 36 is seated between the inclined edge 34 of the bracket member 12 and the inner sides 35 of the gripping fingers so that when the socket element 11 and the bracket member 12 are clamped together the block 36 is cammed upwardly and laterally and will abut against the fender 32 or other object to which the device 10 is to be secured.

In Figure 1, I have shown my device mounted on the fender 32 of an automobile which is the preferred embodiment of my invention, however, obviously, it may be secured to other similar articles. In mounting my device to the fender 32 of an automobile the socket element 11 is placed against the outside of the fender as shown in Figure 1. The bracket 12 is then placed underneath and on the inside of the fender 32 so that the flat surface 29 of the bracket 12 rests on the flange 16. The bolt 19 is then placed through the holes 17 and 26 and the nut 31 and washer 30 are secured to the free end of the bolt. The block 36 is then placed between the bracket member 12 and the socket element 11 in a manner as illustrated in Figure 1. The rear portion of the block 36 is in contact with and is positioned between the inclined surface 34 and the inner sides 35 of the gripping fingers 27, while the front portion of the block 36 abuts against the auto fender 32. The nut and bolt assembly is then tightened until the socket element 11 and bracket member 12 clamping block 36 and fender 32 are firmly and securely clamped together.

As a final adjustment, the adjusting screw 22 may be tightened which in turn will contact the base 23 of the pin 21 causing it to abut against the fender 32. As the pin 21 does not turn, but, is merely forced inward, the paint finish will not be marred and the holder 10 will be securely held on the fender.

While the invention has been described in detail and with respect to a present preferred form which the invention may assume, it is not to be limited to such details and form since many changes and modifications may be made in the invention without departing from the spirit and scope of the invention in its broadest aspects. Hence it is desired to cover any and all forms and modifications of the invention which may come within the language or scope of any one or more of the appended claims.

I claim:

1. A flag pole holder adapted to be mounted on the fender of an auto, said holder comprising a socket element and a bracket member, clamping means for securing said element and bracket member together, a cylindrical clamping block mounted between said socket element and bracket member, said socket element and clamping block being adapted to engage the edge of the fender between them, said bracket member being moveable against said block urging said block upwardly and laterally providing a clamping action between the clamping block and the socket member against the edge of the fender.

2. A flag pole holder adapted to be mounted on the fender of an auto, said holder comprising a socket element and a bracket member, said socket element and bracket member being equipped with holes, clamping means for securing said element and member together, said means comprising a threaded bolt disposed in said holes, a cylindrical clamping block mounted between said socket element and bracket member, said socket member and clamping block being adapted to engage the edge of the fender between them, said bracket member being moveable against said block urging said block upwardly and laterally providing clamping action between the clamping block and the socket member against the edge of the fender.

3. A flag pole holder adapted to be mounted on the fender of an auto, said holder comprising a socket element and a bracket member, said socket element and bracket member being equipped with holes, clamping means for securing said element and member together, said means comprising a threaded bolt disposed in said holes, a cylindrical clamping block mounted between said socket element and bracket member, said socket member and clamping block being adapted to engage the edge of the fender between them, said bracket member being moveable against said block urging said block upwardly and laterally providing a clamping action between the clamping block and the socket member against the edge of the fender, and additional securing means mounted in said socket element to prevent relative movement of the holder with respect to the fender.

4. A flag pole holder adapted to be mounted to the fender of an auto, said fender having a bead along its free edge, said holder comprising a socket element and a bracket member, said socket element and bracket member equipped with holes, clamping means for securing said element and bracket together, said means comprising a threaded bolt disposed in said holes, said socket element having a rearwardly extending flange, said bracket member having spaced gripping fingers and a flat surface adapted to be supported by said flange, a clamping block mounted between said socket element and bracket member, said socket element and clamping block being adapted to engage the edge of the fender between them above the bead thereon, said bracket member being moveable against said block to provide a clamping action between the clamping block and the socket member against the edge of the fender, and additional securing means mounted in said socket element to prevent relative movement of the holder with respect to the fender.

5. A flag pole holder adapted to be mounted to the fender of an auto, said holder comprising a socket element and a bracket member, said socket element and bracket member being equipped with holes, clamping means for securing said element and bracket together, said means comprising a threaded bolt disposed in said holes, said socket having a rearwardly extending flange, said bracket member having spaced gripping fingers and a flat surface adapted to be supported by said flange, a cylindrical clamping block mounted between said socket element and bracket member, said socket element and clamping block being adapted to engage the edge of the fender between them, said bracket member being movable against said block urging said block upwardly and laterally providing a clamping action between said block and the socket member against the edge of the fender, and additional securing means mounted in said socket element to prevent relative movement of the holder with respect to the fender, said additional securing means comprising a pin with an enlarged circular head slidably mounted in the socket element and an adjusting screw carried by said socket element whereby when said adjusting screw is tightened the pin, without turning, is forced inwardly and the enlarged circular head thereof is pressure secured to the fender causing the holder to be more securely held on the fender.

DIGBY W. CHANDLER.

REFERENCES CITED

The following references are of record in the file of this patent:

UNITED STATES PATENTS

| Number | Name | Date |
| --- | --- | --- |
| Re. 19,111 | Harrington | Mar. 13, 1934 |
| 1,536,900 | Lowe | May 5, 1925 |
| 1,597,266 | Dearman | Aug. 24, 1926 |
| 1,784,466 | Rensonnet | Dec. 9, 1930 |
| 1,877,428 | Rensonnet | Sept. 13, 1932 |
| 2,121,317 | Cohen | June 21, 1938 |